United States Patent
Chu et al.

(10) Patent No.: US 7,486,494 B1
(45) Date of Patent: Feb. 3, 2009

(54) SCR WITH A FUSE THAT PREVENTS LATCHUP

(75) Inventors: Charles Chu, Diamond Bar, CA (US); Marcel ter Beek, Pleasanton, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 156 days.

(21) Appl. No.: 11/504,991

(22) Filed: Aug. 16, 2006

(51) Int. Cl.
*H02H 5/04* (2006.01)
*H02H 1/00* (2006.01)

(52) U.S. Cl. ...................................... 361/104
(58) Field of Classification Search ................. 361/104
See application file for complete search history.

(56) References Cited

U.S. PATENT DOCUMENTS

| | | | | |
|---|---|---|---|---|
| 3,564,206 A | * | 2/1971 | Lauck, III | 219/501 |
| 3,588,598 A | * | 6/1971 | Isaacs | 315/199 |
| 3,700,968 A | * | 10/1972 | Spies | 361/92 |
| 3,772,590 A | * | 11/1973 | Mikulecky et al. | 324/424 |
| 3,819,986 A | * | 6/1974 | Fukuoka | 361/56 |
| 4,348,582 A | * | 9/1982 | Budek | 219/483 |
| 4,751,603 A | * | 6/1988 | Kwan | 361/42 |
| 5,341,267 A | | 8/1994 | Whitten et al. | 361/56 |
| 5,552,338 A | | 9/1996 | Kang | 437/170 |
| 5,815,365 A | * | 9/1998 | Stege | 361/195 |
| 6,031,405 A | * | 2/2000 | Yu | 327/313 |
| 6,469,884 B1 | | 10/2002 | Carpenter, Jr. et al. | 361/111 |
| 6,762,918 B2 | | 7/2004 | Voldman | 361/91.1 |
| 6,980,411 B2 | * | 12/2005 | Schilling | 361/119 |
| 2005/0269666 A1 | * | 12/2005 | Chung et al. | 257/528 |

* cited by examiner

*Primary Examiner*—Ronald W Leja
(74) *Attorney, Agent, or Firm*—Mark C. Pickering

(57) ABSTRACT

A chip which utilizes a silicon controlled rectifier (SCR) for ESD protection prevents a latchup condition from occurring when the SCR misfires and turns on during normal operation by utilizing a fuse in series with the SCR. The fuse allows the SCR to perform normally during an ESD event, but blows if the SCR misfires and attempts to pull a pin voltage down to the holding voltage.

20 Claims, 1 Drawing Sheet

SCR WITH A FUSE THAT PREVENTS LATCHUP

BACKGROUND OF THE INVENTION

1. Field of the Invention

The present invention relates to silicon controller rectifiers (SCRs) and, more particularly, to an SCR with a fuse that prevents latchup.

2. Description of the Related Art

A silicon controlled rectifier (SCR) is a device that provides an open circuit between a first node and a second node when the voltage across the first and second nodes is positive and less than a trigger voltage. However, when the voltage across the first and second nodes rises to be equal to or greater than the trigger voltage, the SCR snaps back.

When the SCR snaps back, the SCR allows a large current to flow between the first and second nodes at a much lower voltage as long as a minimum current or a minimum voltage, known as a holding current or a holding voltage, is maintained. If the current flowing between the first and second nodes falls below the holding current, or the voltage across the first and second nodes falls below the holding voltage, the SCR again provides an open circuit between the first and second nodes.

As a result of these characteristics, SCRs are used with electronic circuits to protect the electronic circuits from an electro-static discharge (ESD) pulse when an ESD pulse is unintentionally applied to the pins of a chip that houses the electronic circuits. An ESD pulse can be unintentionally generated when a chip is handled prior to being attached to a printed circuit board.

When an ESD pulse is generated, a very high potential is momentarily placed on a pin while the chip is otherwise powered off. If another pin is grounded, a very large current can flow from the high potential pin through circuitry in the chip to the grounded pin. If the pins are not ESD protected, the current can destroy the circuitry in the chip.

FIG. 1 shows a schematic diagram that illustrates a portion of a conventional chip 100. As shown in FIG. 1, chip 100 includes a first pin 110 and a second pin 112. In addition, chip 100 includes an electronic circuit 114 and an SCR 116 that are both connected to first pin 110 and second pin 112.

Thus, during normal operation, SCR 116 provides an open circuit between first pin 110 and second pin 112. However, when first pin 110 receives a voltage spike that equals or exceeds the trigger voltage of SCR 116, such as when an ungrounded human-body contact occurs, SCR 116 provides a low-resistance current path from first pin 110 to second pin 112, thereby protecting electric circuit 114 from damage.

An SCR ideally operates within an ESD protection window that has a maximum voltage that is defined by the destructive breakdown level of the devices that are electrically connected to a pin, and a minimum voltage that is defined by any DC bias voltage that is present on the pin during normal operation. The trigger voltage of the SCR is then set to a value that is less than the maximum voltage of the window, while the holding voltage is set to a value that is greater than the minimum voltage of the window.

It is often difficult to fabricate an SCR that has a holding voltage which is greater than the DC bias voltage that is placed on the pin during normal operation. As a result, many SCRs are fabricated with a holding voltage that is less than the DC bias voltage. However, when the holding voltage is less than the DC bias voltage, the chip is subject to a condition known as latchup.

Latchup occurs when the SCR misfires and turns on during normal operation. When the holding voltage is less than the DC bias voltage, and the SCR turns on and remains turned on during normal operation, the SCR pulls the voltage on the pin down to the holding voltage which, in turn, effectively disables the entire operation of the circuitry with the chip.

For example, if an SCR has a holding voltage of 1.0V and the chip places a DC bias voltage of 1.8V on a pin during normal operation, then the SCR pulls the voltage on the pin down to 1.0V when the SCR misfires and turns on during normal operation. In addition, since the DC bias voltage of 1.8V is greater than the holding voltage of 1.0V, the DC bias voltage ensures that once the SCR misfires and turns on, the SCR remains turned on until power is removed from the chip. Thus, unless the circuitry on the chip can operate with 1.0V, the circuitry is disabled.

In addition, if the SCR sinks a large current while latched up, the large current can lead to excessive heating that can burn out the circuitry on the chip. As a result, there is a need for an approach that prevents an SCR from latching up when the SCR, which has a holding voltage less than the DC bias voltage, misfires and turns on during normal operation.

DETAILED DESCRIPTION OF THE INVENTION

Figure 1:
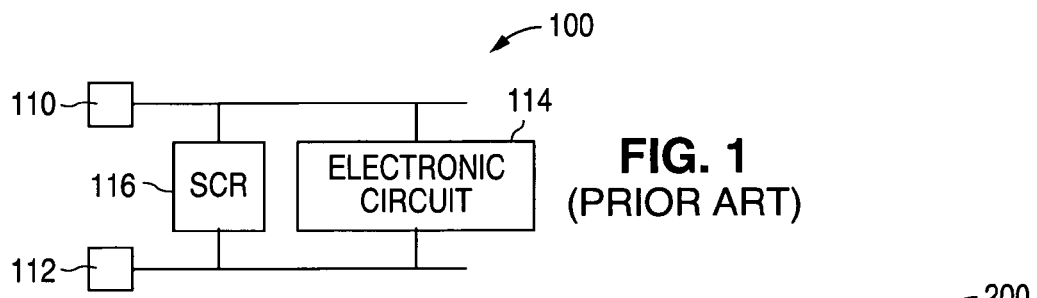
FIG. 1 is a schematic diagram illustrating a portion of a conventional chip 100.
Figure 2:
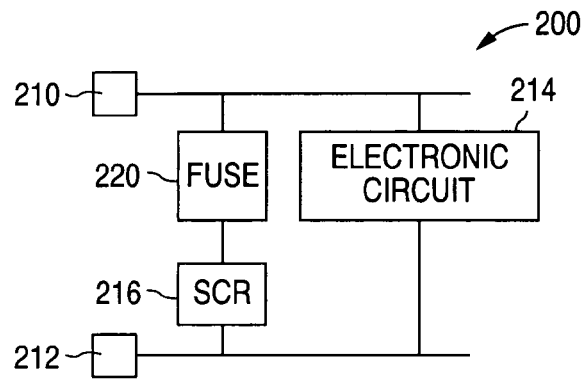
FIG. 2 is a schematic diagram illustrating an example of a portion of a chip 200 in accordance with the present invention.

FIG. 2 shows a schematic diagram that illustrates an example of a portion of a chip 200 in accordance with the present invention. As described in greater detail below, the chip of the present invention utilizes a fuse in series with an SCR to prevent latchup from occurring when the SCR misfires and turns on during normal operation.

As shown in the FIG. 2 example, chip 200 includes a first pin 210, a second pin 212, and an electronic circuit 214 that is connected to both first pin 210 and second pin 212. In addition, chip 200 includes a silicon controller rectifier (SCR) 216 that lies between first pin 210 and second pin 212.

In accordance with the present invention, chip 200 also includes a fuse 220 that is connected in series with SCR 216 between first pin 210 and second pin 212 so that a voltage applied across the first and second pins 210 and 212 is applied across SCR 216 and fuse 220. For example, if 1.8V is applied to first pin 210 and ground is applied to second pin 212, then 1.8V is also applied across SCR 216 and fuse 220. In addition, although fuse 220 is shown connected to first pin 210 and SCR 216, with SCR 216 connected to second pin 212, SCR 216 can alternately be connected to first pin 210 and fuse 220, with fuse 220 connected to second pin 212.

During normal operation, SCR 216 provides an open circuit between first pin 210 and second pin 212. However, when first pin 210 receives a voltage spike that equals or exceeds the trigger voltage of SCR 216, SCR 216 and fuse 220 provide a low-resistance current path from first pin 210 to second pin 212, thereby protecting electronic circuit 214 from damage.

In accordance with the present invention, if SCR 216 misfires and turns on during normal operation, a misfire current flows from first pin 210 to second pin 212 through SCR 216 and fuse 220. The misfire current flowing through fuse 220, however, heats up and blows fuse 220. When fuse 220 is blown, the blown fuse forms an open circuit that prevents the misfire current from continuing to flow through SCR 216. As a result, fuse 220 prevents SCR 216 from pulling the voltage on first pin 210 down to the holding voltage, and from a thermal overrun which can destroy chip 200.

Fuse 220 satisfies the 2500V human body model (HBM) and the 250V machine model (MM), while also burning out and blowing in response to the misfire current because an ESD pulse is short when compared to the time required to blow fuse 220. In other words, fuse 220 does not blow in response to a 4A ESD pulse, but does blow in response to a 50 mA misfire current, because the 4A ESD pulse is present for a much shorter time than the 50 mA misfire current is present.

In addition, the misfire current takes a relatively short period of time to blow fuse 220 such that the devices in electronic circuit 214 that receive the DC bias voltage from pin 210 only experience a momentary glitch in the power. This momentary glitch, in turn, is insufficient to alter the normal operation of the devices in electronic circuit 214 connected to first pin 210.

Figure 3:
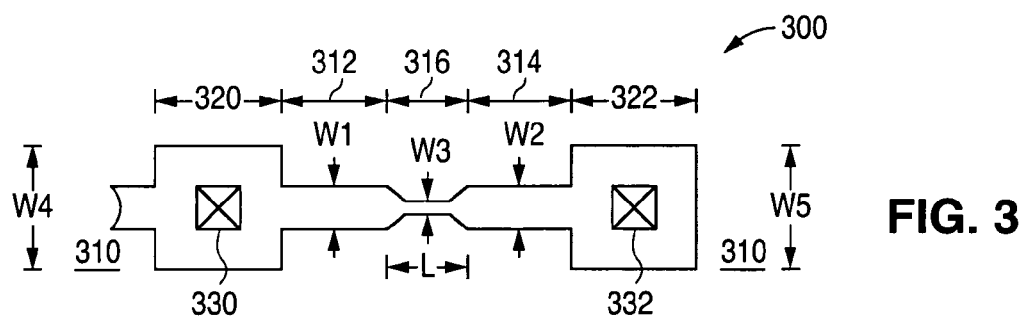
FIG. 3 is a plan view illustrating an example of a portion of an interconnect structure 300 in accordance with the present invention.

Fuse 220 can be implemented in a number of different ways. For example, fuse 220 can be formed as a conductive line that has a necked down section. FIG. 3 shows a plan view that illustrates an example of a portion of an interconnect structure 300 in accordance with the present invention.

As shown in FIG. 3, interconnect structure 300 includes a region of isolation material 310, a first conductive section 312, a second conductive section 314, and a third conductive section 316 that lies between and contacts the first and second conductive sections 312 and 314. The first, second, and third conductive sections 312, 314, and 316 contact and lie on isolation region 310.

In addition, first conductive section 312 has a first width W1, second conductive section 314 has a second width W2 that is substantially equal to the first width W1, and third conductive section 316 has a third width W3 that is less than the first and second widths W1 and W2. The first, second, and third widths W1, W2, and W3 are measured parallel to each other.

The width W3 of third conductive section 316 can be formed to be, for example, 5 μM to 10 μM, depending on the magnitude of the misfire current and the maximum glitch in the DC bias voltage that can be tolerated by the devices in electronic circuit 214. Third conductive section 316 has the same thickness as the first and second conductive sections 312 and 314, and can have a number of different lengths L, such as 20 μM, since the width W3 of third conductive section 316 defines the time required to vaporize a portion of third conductive region 316 and form an open circuit. For example, a third conductive section 316 which is 5 μM wide can vaporize a portion of third conductive section 316 to form an open circuit in response to a 50 mA misfire current in a very short period of time.

In the FIG. 3 example, third conductive section 316 can be a necked down portion of a metal trace or a polysilicon strip. Examples of polysilicon-based fuse structures are described in U.S. Pat. No. 6,166,421 to Kalnitsky et al., issued on Dec. 26, 2000, and U.S. patent application Ser. No. 11/312,215, filed on Dec. 19, 2005, which are hereby incorporated by reference.

As further shown in FIG. 3, interconnect structure 300 includes a fourth conductive section 320 that lies on isolation region 310, and a fifth conductive section 322 that lies on isolation region 310. Fourth conductive section 320, which is connected to first conductive section 312, has a fourth width W4 that is greater than the first width W1. Similarly, fifth conductive section 322, which is connected to second conductive section 314, has a fifth width W5 that is greater than the second width W2.

Interconnect structure 300 also includes a first vertical conductive segment 330 that contacts a center region of the fourth conductive section 320, and a second vertical conductive segment 332 that contacts a center region of the fifth conductive section 322. The first and second vertical conductive segments 330 and 332 can be implemented as contacts and/or vias.

Figure 4:
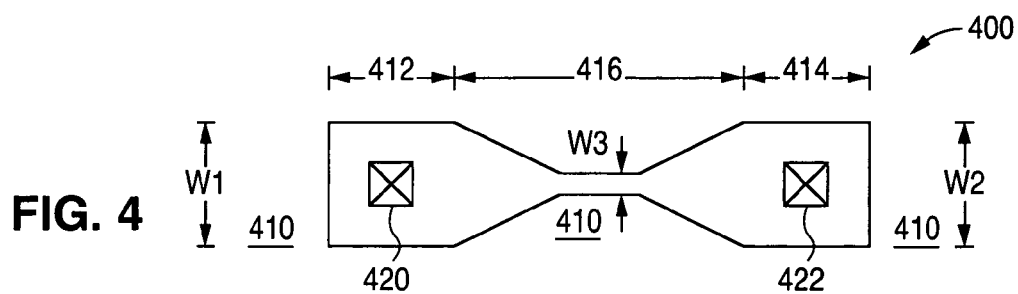
FIG. 4 is a plan view illustrating an example of a portion of an interconnect structure 400 in accordance with the present invention.

Alternately, rather than having fourth and fifth conductive sections that are wider than the first and second conductive sections, the contacts and/or vias can be connected to the first and second regions. FIG. 4 shows a plan view that illustrates an example of a portion of an interconnect structure 400 in accordance with the present invention.

As shown in FIG. 4, interconnect structure 400 includes a region of isolation material 410, a first conductive section 412, a second conductive section 414, and a third conductive section 416 that lies between and contacts the first and second conductive sections 412 and 414. The first, second, and third conductive sections 412, 414, and 416 contact and lie on isolation region 410.

In addition, first conductive section 412 has a first width W1, second conductive section 414 has a second width W2 substantially equal to the first width W1, and third conductive section 416 has a third width W3 that is less than the first and second widths W1 and W2. The first, second, and third widths W1, W2, and W3 are measured parallel to each other. Further, third conductive section 416 has the same thickness as the first and second conductive sections 412 and 414, and can have a number of different lengths.

As further shown in FIG. 4, interconnect structure 400 includes a first vertical conductive segment 420 that contacts a center region of the first conductive section 412, and a second vertical conductive segment 422 that contacts a center region of the second conductive section 414. The first and second vertical conductive segments 420 and 422 can be implemented as contacts and/or vias. Thus, the first and second vertical conductive segments 420 and 422 can be formed on the first and second conductive sections 412 and 414.

Figure 5:
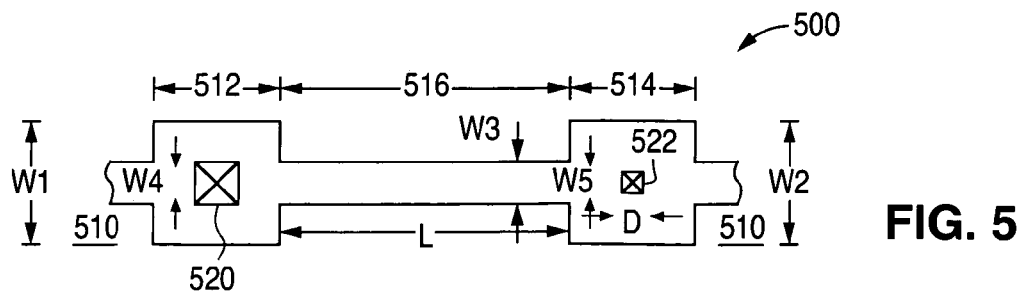
FIG. 5 is a plan view illustrating an example of a portion of an interconnect structure 500 in accordance with the present invention.

In addition to a necked down region of a conductive line, fuse 220 can also be implemented as a thinner contact/via structure. FIG. 5 shows a plan view that illustrates an example of a portion of an interconnect structure 500 in accordance with the present invention. As shown in FIG. 5, interconnect structure 400 includes a region of isolation material 510, a first conductive section 512, a second conductive section 514, and a third conductive section 516 that lies between and contacts the first and second conductive sections 512 and 514. The first, second, and third conductive sections 452, 514, and 516 contact and lie on isolation region 510.

As further shown in FIG. 5, interconnect structure 500 includes a first vertical conductive segment 520 that contacts a center region of the first conductive section 512, and a second vertical conductive segment 522 that contacts a center region of the second conductive section 514. The first and second vertical conductive segments 520 and 522 can be implemented as contacts and/or vias.

In addition, first conductive section 512 has a first width W1, second conductive section 514 has a second width W2 substantially equal to the first width W1, and third conductive section 516 has a third width W3 that is less than the first and second widths W1 and W2. The first, second, and third widths W1, W2, and W3 are measured parallel to each other.

Further, first vertical conductive segment 520 has a fourth width W4, and second vertical conductive segment 520 has a fifth width W5 that is less than the fourth width W4. The fourth and fifth widths W4 and W5 are measured parallel to the first, second, and third widths W1, W2, and W3. Alternately, second vertical conductive segment 522 can have a width W5 substantially equal to the fourth width W4, but a dimension D, measured normal to the fourth width W4 along a length L of the third conductive section 516, which is less than the fourth width W4. A thinner contact/via structure functions in the same way as a necked down portion of a conductive line, remaining intact in response to an ESD pulse and blowing in response to a misfire current.

Returning to FIG. 2, once fuse 220 has been blown, a current path from first pin 210 to second pin 212 through SCR 216 is permanently removed. However, once chip 200 has been attached to a printed circuit board, there is no longer any need for ESD protection. This is because all of the chips on the printed circuit board are protected by bypass capacitors that can absorb an ESD pulse.

Thus, chip 200 is operated by applying a DC bias voltage to pin 210. All of the DC bias voltage is placed across SCR 216 and fuse 220, which are connected in series. The DC bias voltage is substantially constant, and not ever intentionally raised to a level that is sufficient to turn on SCR 216. If SCR 216 misfires and turns on during normal operation, fuse 220 blows quickly such that electronic circuit 214 experiences only a momentary glitch in the power.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A chip comprising:
   a first pin;
   a second pin;
   an electronic circuit connected to the first pin and the second pin;
   a silicon controlled rectifier lying between the first pin and the second pin; and
   a fuse connected in series with the silicon controlled rectifier between the first pin and the second pin so that a voltage applied across the first and second pins is applied across the silicon controlled rectifier and the fuse.

2. The chip of claim 1 wherein the fuse is connected to the first pin and the silicon controlled rectifier.

3. The chip of claim 1 wherein the silicon controlled rectifier is connected to the pin and the fuse.

4. The chip of claim 1 wherein the fuse includes:
   a first conductive section having a first width;
   a second conductive section having a second width; and
   a third conductive section having a third width, the third conductive section lying between and contacting the first and second conductive sections, the first, second, and third conductive sections being formed on a layer of isolation material, the third width being less than the second width.

5. The chip of claim 4 wherein the fuse further includes:
   a fourth conductive section that contacts the second conductive section, the fourth conductive section being formed on the layer of isolation material, and having a center region and a fourth width that is greater than the second width; and
   a vertical conductive segment that contacts the center region of the fourth conductive section.

6. The chip of claim 5 wherein the first and second widths are substantially equal.

7. The chip of claim 6 wherein the first, second, third, and fourth conductive sections are metal.

8. The chip of claim 4 wherein the fuse further includes:
   a first vertical conductive segment that contacts the first conductive section; and
   a second vertical conductive segment that contacts the second conductive section.

9. The chip of claim 1 wherein the fuse includes:
   a first conductive section having a first width;
   a second conductive section having a second width;
   a third conductive section having a third width, the third conductive section lying between and contacting the first and second conductive sections, the first, second, and third conductive sections being formed on a layer of isolation material;
   a first vertical conductive segment having a fourth width measured parallel to the second width, the first vertical conductive segment contacting the first conductive section; and
   a second vertical conductive segment having a fifth width measured parallel to the second width, the second vertical conductive segment contacting the second conductive section.

10. The chip of claim 9 wherein the fifth width is less than the fourth width.

11. A chip comprising:
    a first external electrical connection point;
    a second external electrical connection point;
    an electronic circuit connected to the first external electrical connection point and the second external electrical connection point;
    a silicon controlled rectifier lying between the first external electrical connection point and the second external electrical connection point; and
    a fuse connected in series with the silicon controlled rectifier between the first external electrical connection point and the second external electrical connection point so that a voltage applied across the first and second external electrical connection points is applied across the silicon controlled rectifier and the fuse.

12. The chip of claim 11 wherein the fuse has a length and two or more widths.

13. The chip of claim 11 wherein the fuse has a horizontal section, a first vertical section that touches a first end of the horizontal section, and a second vertical section that touches a second end of the horizontal section, the first and second vertical sections having different cross sectional areas.

14. The chip of claim 11 wherein the fuse to blow and form an open circuit when the silicon controlled rectifier turns on and sinks a current for longer than a predefined period of time, the current having a magnitude throughout the predefined period of time that is insufficient to physically destroy the electronic circuit.

15. The chip of claim 14 wherein the fuse to remain intact and maintain a current path when the silicon controlled rectifier turns on and sinks a current that is sufficient to physically destroy the electronic circuit.

16. A chip comprising:
  a first external electrical connection point;
  a second external electrical connection point;
  an electronic circuit directly electrically connected to the first external electrical connection point and the second external electrical connection point;
  an electrostatic discharge (ESD) circuit directly electrically connected to the first external electrical connection point and the second external electrical connection point, the ESD circuit:
    blocking current from flowing from the first external electrical connection point to the second external electrical connection point when a voltage on the first external electrical connection point rises from ground to lie within an operational voltage range without exceeding a trigger voltage,
    providing a current path from the first external electrical connection point to the second external electrical connection point when the voltage on the first external electrical connection point spikes up to a peak voltage greater than the trigger voltage and less than a destruction voltage, the ESD circuit maintaining the current path as long as the voltage on the first external electrical connection point remains below the peak voltage and above a holding voltage that is less than the peak voltage, and the current path through the ESD circuit conducts less than a destructive level of current; and
    blocking current from flowing from the first external electrical connection point to the second external electrical connection point when the voltage on the first external electrical connection point declines from the peak voltage to a voltage that continuously remains within the operational voltage range for longer than a predefined time, the operational voltage range lying above the holding voltage.

17. The chip of claim 16 and further comprising blocking current from flowing from the first external electrical connection point to the second external electrical connection point when the voltage on the first external electrical connection point declines from the peak voltage to a voltage that is less than the holding voltage.

18. The chip of claim 16 wherein the ESD circuit includes a fuse.

19. The chip of claim 18 wherein the ESD circuit includes a silicon controller rectifier connected in series with the fuse.

20. The chip of claim 18 wherein the fuse to blow and form an open circuit when the voltage on the first external electrical connection point declines from the peak voltage to a voltage that continuously remains within the operational voltage range for longer than the predefined time.

* * * * *